Aug. 2, 1960

H. H. MATSUURA 2,947,822

SNAP COUPLING BETWEEN EYEGLASS TEMPLE
PLATE AND HEARING AID HOUSING
Filed Aug. 3, 1959

Inventor
Harumi H. Matsuura
By His Attorneys

United States Patent Office 2,947,822
Patented Aug. 2, 1960

2,947,822

SNAP COUPLING BETWEEN EYEGLASS TEMPLE PLATE AND HEARING AID HOUSING

Harumi H. Matsuura, Minneapolis, Minn., assignor to Maico Electronics, Inc., Minneapolis, Minn., a corporation of Minnesota Filed Aug. 3, 1959, Ser. No. 831,223

9 Claims. (Cl. 179—107)

This invention relates to a temple construction for spectacle mounted hearing aids and the like and more specifically to a readily demountable hearing aid temple construction.

An object of this invention is the provision of a novel temple mounted hearing aid construction, of simple and inexpensive construction, for use with spectacle frames and arranged and constructed to be readily demountable therefrom.

Another object of this invention is the provision of a novel and improved temple mounted hearing aid construction for use with spectacle frames and having a temple plate member and hearing aid housing member detachably secured together which permits ready replacement of the housing member and plate member with a minimum of inconvenience.

Another object of this invention is to provide a novel and improved temple mounted hearing aid device for use with spectacle frames and including a temple plate member and hearing aid housing member releasably locked together and arranged and constructed to prevent accidental unlocking of the members while the device is being worn by a user.

A still further object of this invention is to provide a novel and improved temple mounted hearing aid construction for use with eyeglasses and including an elongated plate member and hearing aid housing member having readily releasable locking means for securing the members together and arranged and constructed to permit the hearing aid construction to be of compact, slim construction.

These and other objects and advantages of this invention will more readily appear from the following description made in connection with the accompanying drawings wherein like reference characters refer to the same or similar parts throughout the several views, and in which.

Figure 1:
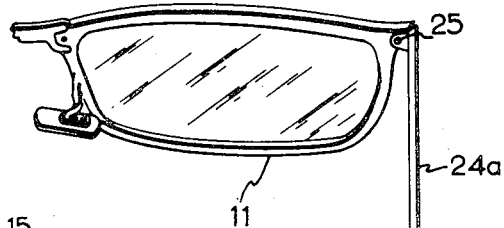
Fig. 1 is a top plan view of the hearing aid temple construction and a portion of a spectacle frame with certain concealed parts shown by dotted line configuration and other parts indicated by dotted lines in their unlocked position.
Figure 2:
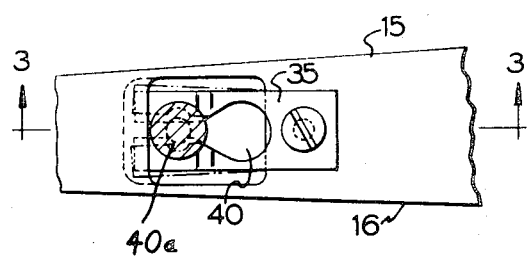
Fig. 2 is a section taken on line 2—2 of Fig. 1 and enlarged to show details thereof.

One embodiment of the present invention is shown in the drawings and is described herein. Although only one temple construction is shown in the drawing, it is to be understood that the device is to be used with a complete spectacle frame and will require another temple construction which will be identical to the one disclosed except for the particular arrangement with respect to the right and left side of a person's head. The spectacle frame designated by the reference numeral 11 may be of any suitable design or shape.

Temple construction 10 includes an elongate housing member 12 which is adapted to lie along the side of a person's head. Housing member 12 defines an inner chamber 13 which may be divided into two or more compartments for receiving various electrical components therein. Housing member 12 has a closed inner side which, of course, is impervious to the passage of moisture and inner side 14 will ordinarily engage the side of a person's head. Housing member 12 also includes top and bottom sides 15 and 16 respectively which may be also impervious to the passage of moisture thereto.

Figure 4:
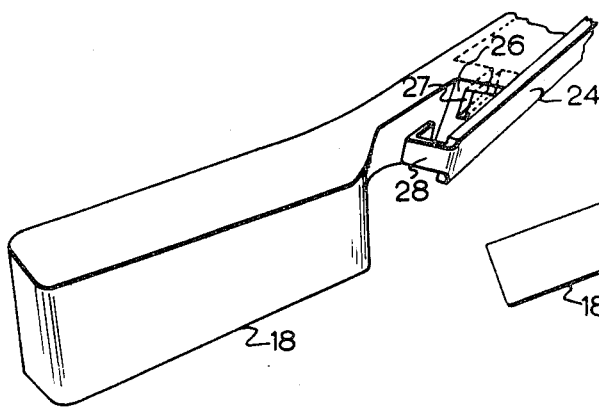
Fig. 4 is an enlarged fragmentary perspective view of certain of the parts in an unlocked condition indicating the details thereof.
Figure 5:
Fig. 5 is a detail side elevation view of the rear portion of the temple construction.

Housing member 12, in the embodiment shown, is molded of a suitable substantially rigid plastic material of integral one piece construction. Rear end portion 16a of housing member 12 is contoured and shaped as at 17 to pass over the top of a person's ear and to generally follow the curvature of a person's head in the manner of conventional eyeglasses. Referring now to Fig. 4 of the drawing, it will be seen that the rear end portion 16a of housing member 12 has a forwardly facing surface 18 engageable with a person's ear and when the temple is assembled and the spectacles are being worn, surface 18 will restrict forward movement of the housing member 12.

The outer side of housing 12 is open and provides access to chamber 13 which contains a number of the components of the electrical hearing aid circuitry. Such components may include the speaker 19, signal amplifier transistor circuit 20, battery 21 and a microphone 22. It will be noted that battery 21 and microphone 22 are disposed in a chamber at the rear end portion 16 which chamber is closed by a cover plate 23. The outer side of housing member 12 is closed by an elongated plate member 24. It is now pointed out that the above described structure is quite similar to that disclosed in co-pending application Serial Number 762,416, now U.S. Patent 2,904,639. Although not shown, the general shape and configuration of plate member 24 has essentially the same shape as that shown in said patent.

The forward end portion 24a of plate member 24 extends forwardly beyond the forward end of housing member 12 and is connected in the usual fashion to a hinge structure 25 which is also connected to spectacle frame 11 in the conventional manner.

Quite often it is desirable to detach the housing member 12 from plate member 24 for having the hearing aid circuitry within the housing member repaired or to perhaps change the plate member 24 to a plate member having a different ornamental configuration. To that end I have provided a readily releasable coupling means for securing the members together. Referring now to Fig. 4, it will be seen that housing member 12 is provided with a substantially rearwardly facing surface 26 having an aperture or recess 27 formed therein. Temple plate member 24 is provided with a hook element 28 formed integrally with the rear end thereof and which hook element is positioned within recess 26 upon rearward movement of housing member 12 with respect to the temple plate member 24.

A snap coupling mechanism, generally designated 29, is provided for releasably securing plate member 25 to housing member 12 at a point spaced longitudinally from the hook and recess coupling means. Snap coupling mechanism includes a post or pin 30 secured to the inner side of plate member 24 and which extends laterally therefrom. It will also be noted that post 30 is positioned intermediate the ends of plate member 24 and is provided with an enlarged head 31.

Figure 3:
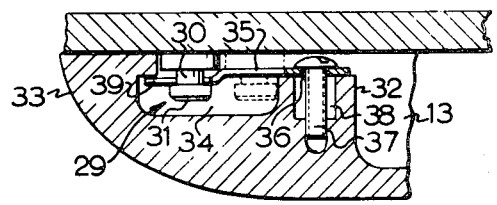
Fig. 3 is a section taken on line 3—3 of Fig. 2 and looking in the direction of the arrows.

Referring now to Fig. 3, it will be seen that housing member 12 is provided with a boss 32 extending outwardly toward the open outer side thereof. Housing member 12 has a curved front wall 33 which cooperates with boss 32 to define a recess 34. An elongated resilient plate 35 of substantially rectangular shape is provided with an opening 36 adajcent one end thereof and a securing bolt 37 passes therethrough into a bore 38 formed in boss 32 to thereby securely attach plate 35 of housing member 12. Plate 35 has its forward end portion 39 offset inwardly of the housing member 12 and a slot 40 of substantially key shaped configuration is formed therein. Plate 35, of course, is formed of resilient material such as spring metal or the like and slot 40 opens outwrdly at the forward end of the plate to thereby permit ready flexing and distortion of the plate during the locking operation. It will also be noted that the elongated portion of slot 40 has an enlarged portion 40a intermediate the ends thereof and which serves to receive post 30 therein. Referring now to Fig. 3, headed post 30 is shown in interlocked relation with slotted plate 35 in full lines and is shown in unlocked condition in dotted line configuration.

The locking operation is accomplished by first placing plate member 24 against housing member 12 in overlying relation with respect to the access opening of the housing member 12. When arranged in this manner, head 31 of post 30 will be disposed within the larger portion of slot 40 and hook element 28 will be aligned with and spaced rearwardly of aperture 27. Upon rearward movement of the housing member 12 with respect to plate member 24, post 30 will be moved into the narrow portion of slot 40 into enlarged portion 40a and head 31 will be in engaging relation with the forward end portion 39 of plate member 35. It will also be noted that during this operation hook element 28 will be simultaneously moved into aperture 27. Forward movement of housing member 12 with respect to plate member 34 will, of course, cause the interlocking elements of the snap coupling mechanism 29 to be unlocked and will simultaneously cause hook element 28 to be removed from within recess 27. When the temple construction is being worn, relative forward movement of housing member 12 with respect to plate member 34 is prevented since forwardly facing surface 18 of the housing member will be engageable with a person's ear and the frames 11, of course, restrict rearward movement of plate 34 because of their engaging relation with a person's face.

It will be noted from the foregoing description that I have provided a novel temple mounted hearing aid construction having readily detachable parts and which are prevented from accidental unlocking when the device is being worn by a user. It will also be noted from the preceding paragraphs that the hook 28 and recess 27 along with the snap coupling mechanism 29 not only permit the temple plate member 34 and housing member 12 to be readily detached from each other but firmly secure the members together at spaced longitudinal points. This particular novel arrangement does not require the housing and temple plate members to be made larger and the slim design is thereby maintained.

By having the housing member readily detachable from the temple plate member, repair of the electrical components within the housing member may be accomplished with a minimum of inconvenience to the user and the temple plates themselves may be interchanged readily if the user desires one or more ornamental design. It will also be noted that the various elements constituting the interlocking means for securing the temple plate and housing member together are all secured to either one member or the other and there is no occasion of losing loose parts.

It will, of course, be understood that various changes may be made in the form, details, arrangement and proportions of the parts without departing from the scope of this invention which consists of the matter shown and described herein and set forth in the appended claims.

What is claimed is:

1. Temple construction including electrical circuitry for use with a spectacle frame, comprising an elongated housing member having a forward compartment and having an outer side and a closed inner side adapted to lie against the side of a person's head, the compartment having access opening through the outer side thereof, electrical circuitry within the compartment and exposed to the exterior through said opening, an elongate plate member overlying the outer side of the compartment and closing said opening, said plate member having a forward end portion extending beyond the end of the housing member and being adapted for attachment to the spectacle frame, a snap coupling releasably securing said members together and including a pair of interlocking elements on the housing and plate members respectively and arranged to be unlocked from each other upon relative movement of said members.

2. Temple construction including electrical hearing aid circuitry for use with a spectacle frame, comprising an elongated housing member adapted to extend in a fore and aft direction and adjacent the side of a person's head, said housing member being adapted to overlie a person's ear and the housing having a forwardly facing surface engageable with a person's ear for restricting forward movement of the housing member, said housing member having a forward compartment having an outer side and a closed inner side and adapted to lie against the side of a person's head, said compartment having access through the outer side thereof, electrical circuitry within the compartment and exposed to the exterior through said opening, an elongated plate member overlying the outer side of the housing member and closing said opening, a snap coupling releasably securing said members together and including a pair of interlocking elements on the housing and plate members respectively and arranged to be unlocked from each other upon forward movement of the housing member respective to the plate member.

3. Temple construction including electrical circuitry for use with a spectacle frame, comprising an elongated housing member having a forward compartment and having an outer side and a closed inner side and adapted to lie against the side of a person's head, the compartment having an access opening through the outer side thereof, electrical circuitry within the compartment and exposed to the exterior through said opening, said housing member being adapted to overlie a person's ear and the housing member having a forwardly facing surface engageable with a person's ear for restricting forward movement of the housing member, an elongated plate member overlying the outer side of the compartment and closing said opening, said plate member having a forward end portion extending beyond the end of the housing member and being adapted for attachment to the spectacle frame, a snap coupling releasably securing said members together and including an interlocking slotted plate and headed post one of which is secured to the housing member and the other of which is secured to the plate member and said plate and post arranged to be unlocked from each other upon forward movement of the housing member with respect to the plate member.

4. The structure as defined in claim 2 wherein said slotted plate is formed of resilient material and said slot is of keyhole configuration.

5. Temple construction including electrical circuitry for use with a spectacle frame, comprising an elongated housing having a forward compartment having an outer side and a closed inner side adapted to lie against the side of a person's head, said compartment having access opening through the outer side thereof, electrical circuitry within the compartment and exposed to the exterior through said opening, said housing being adapted to overlie a person's ear and the housing having a forwardly facing surface engageable with a person's ear for restricting forward movement of the housing member, an elongated plate overlying the outer side of the compartment and closing said opening, said plate having a forward end portion extending beyond the end of the housing and being adapted for attachment to the spectacle frame, a snap coupling and a second coupling cooperating to releasably secure said housing and plate together, each of said couplings including a pair of interlocking elements on said housing and plate respectively and said interlocking elements of said second coupling arranged to be unlocked upon forward movement of the housing with respect to the plate.

6. The structure as defined in claim 5 wherein said second coupling includes a rearwardly facing recess in said housing and a hook element on said plate.

7. The structure as defined in claim 6 wherein one of said snap coupling elements includes an offset resilient plate having a slot of keyhole configuration therein and the other of said snap coupling elements including a headed post.

8. Temple construction including electrical circuitry for use with a spectacle frame, comprising an elongate housing having a forward compartment having an outer side and a closed inner side adapted to lie against the side of a person's head, said compartment having access through the outer side thereof, electrical circuitry within the compartment and exposed to the exterior through said opening, said housing being adapted to overlie a person's ear and the housing having a forwardly facing surface engageable with a person's ear for restricting forward movement of the housing, an elongated plate overlying the outer side of the housing member and closing said opening, said plate member having a rear end and also having a forward portion extending beyond the end of the housing and being adapted for attachment to the spectacle frame, said housing also having a rearwardly opening recess adjacent the rear end of the plate member said plate member having a hook element integral with the rear end thereof and removably positioned within said recess, snap coupling including a pair of releasably interlocked elements on the housing and plate member respectively, said snap coupling together with said hook and recess serving to releasably secure said members together, and forward movement of the housing with respect to the plate causing interlocking elements to be unlocked and simultaneously causing the hook element to be removed from said recess.

9. The structure as defined in claim 2 wherein one of said snap coupling elements includes an offset resilient plate having a keyhole slot therein and the other of said elements includes a headed post.

No references cited.